Figure 1:
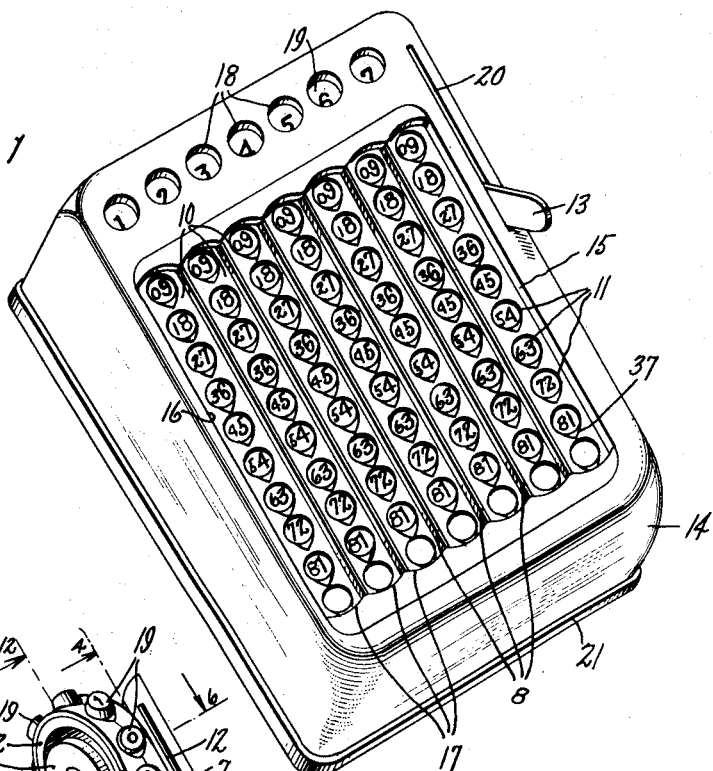

Oct. 31, 1950 — R. A. KRAFT — 2,528,149

ADDING MACHINE

Filed Dec. 31, 1948 — 3 Sheets-Sheet 1

Inventor
Richard A. Kraft
by
His Attorneys

Oct. 31, 1950   R. A. KRAFT   2,528,149
ADDING MACHINE
Filed Dec. 31, 1948   3 Sheets-Sheet 2
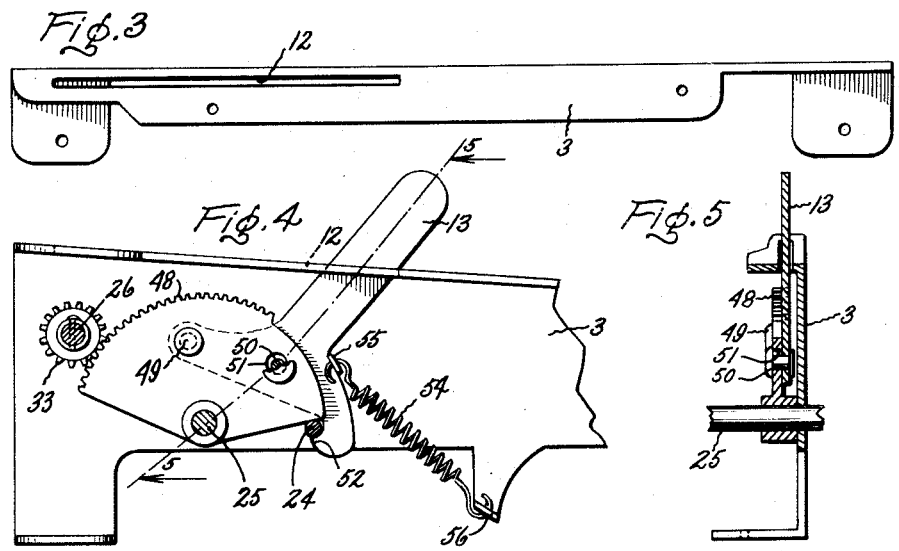
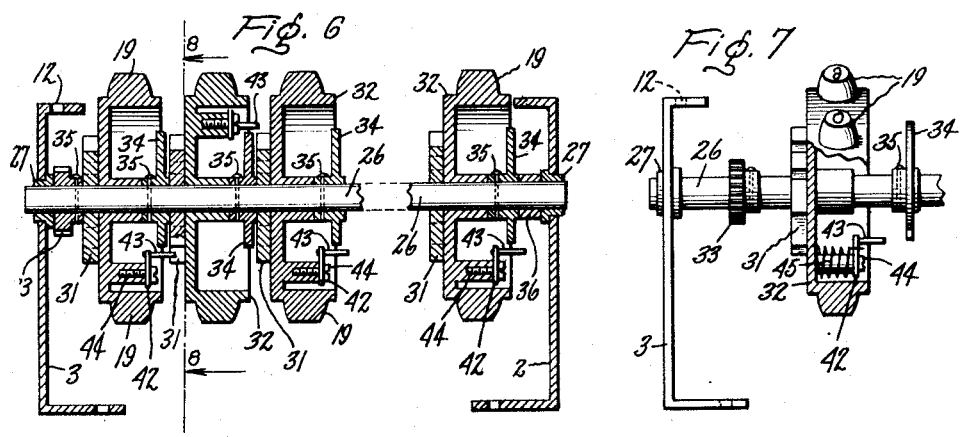
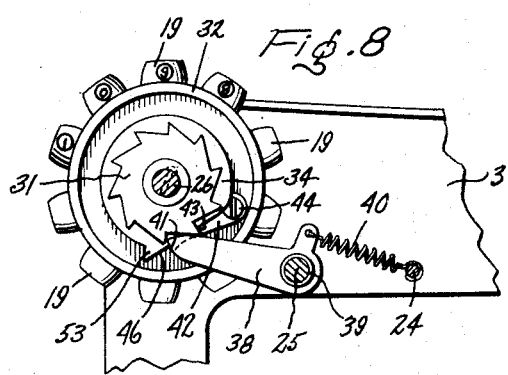
Inventor
Richard A. Kraft
by
His Attorneys Oct. 31, 1950 R. A. KRAFT 2,528,149
ADDING MACHINE
Filed Dec. 31, 1948 3 Sheets-Sheet 3
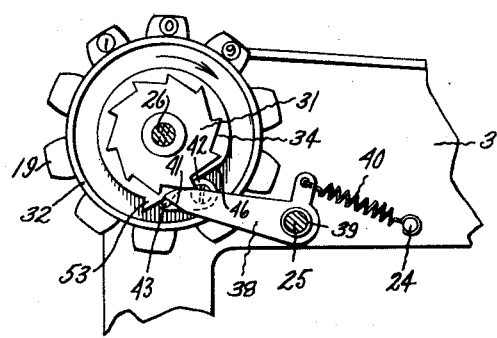
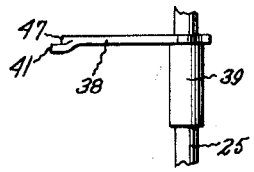
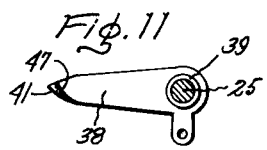
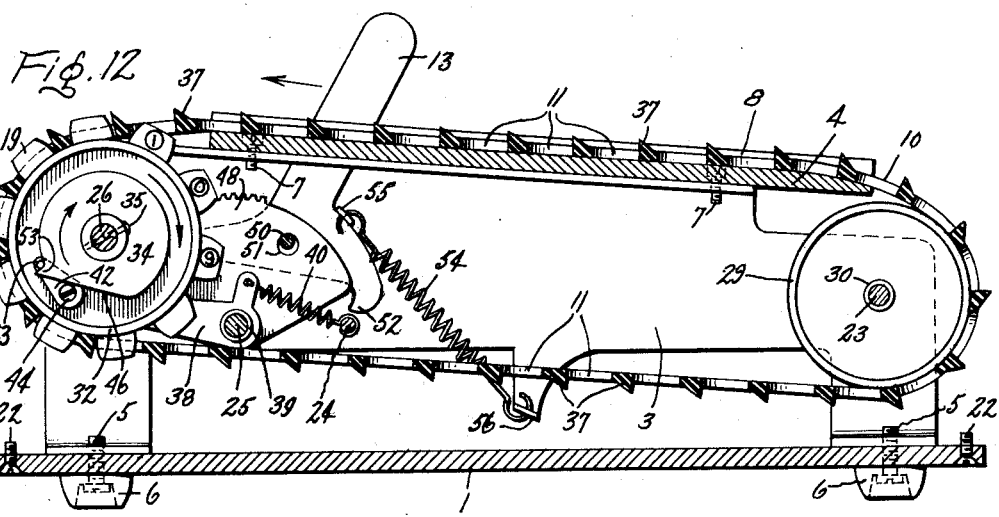
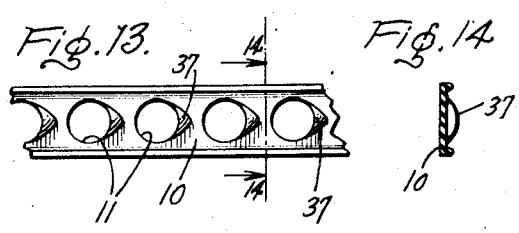
Inventor
Richard A. Kraft
by [signature]
His Attorneys Patented Oct. 31, 1950

2,528,149

UNITED STATES PATENT OFFICE 2,528,149

ADDING MACHINE

Richard A. Kraft, Delmar, N. Y.

Application December 31, 1948, Serial No. 68,515

10 Claims. (Cl. 235—71)

The object of my invention is to produce an adding machine which is light of weight, of simple design and construction and which can be manufactured and sold at an extremely low cost. By virtue of novel features of design, many fewer parts are required than usually employed in machines of this type, all of which can be manufactured by plastic moulding, metal stamping and simple machine operations. The several parts can be assembled into a finished product very rapidly, producing an adding machine which is accurate and rapid of operation, durable and not subject to getting out of order.

Briefly described, this adding machine consists of a series of endless flexible belts which pass over a platform upon which numbers from 1 to 9 have been imprinted and over pulleys having cylindrical projections on their peripheral surface upon which numbers 0 to 9 have been imprinted, the belts having circular openings spaced to conform with the numbers imprinted on the platform, permitting full view of the numbers thereon and fitting over the cylindrical projections on the numbered pulleys. Belts of varying colors may be used on the several banks to distinguish between dollars and cents, thousands, etc. An outer case or shell is provided with openings to permit access to the belts, portholes to permit reading the totals appearing on the numbered pulleys, and stops to assure accurate movement of the belts.

Operation of the machine is accomplished by inserting a finger tip or blunt instrument into the circular openings of the flexible belt at the number to be registered and pulling the belt forward to the stop on the outer case; protruding keys or grips on the belt assuring a firm grip. This operation is repeated for each number to be registered, moving either from left to right or vice versa. The movement of the belt advances the numbered pulley the same number of positions which the belt is advanced. Suitable mechanism is provided to advance the numbered pulley on the left one position when the next adjacent pulley to the right thereof is advanced from 9 to 0. Running totals appear in the portholes of the outer case. Clearance of the registered totals is accomplished by moving the clearance lever forward, causing zero (0) to appear in all portholes, and allowing the lever to drop back to its original position thus permitting instant reuse.

Figure 2:
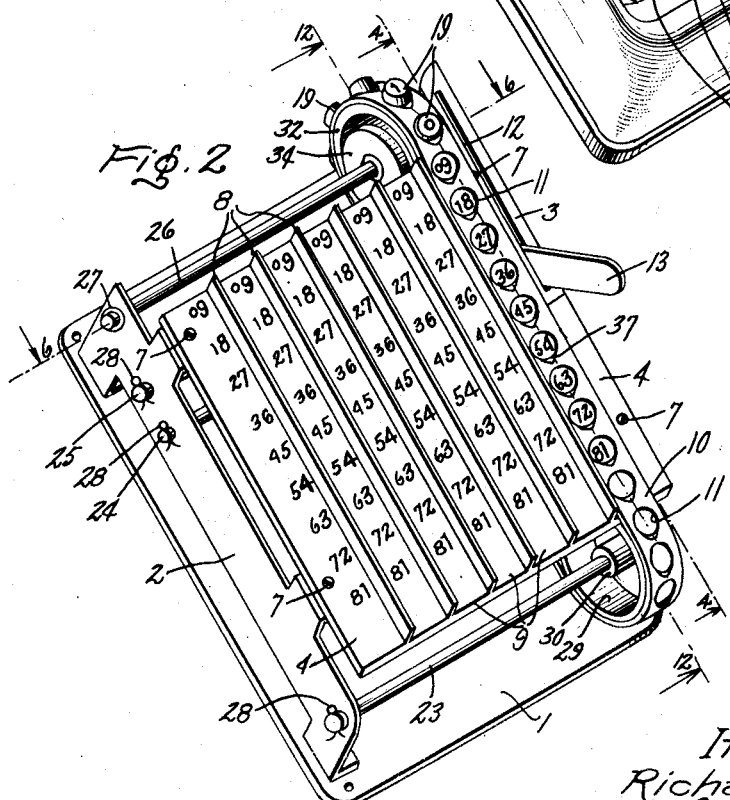

These features are more fully described hereinafter, illustrated in the accompanying drawings, and specified in the claims. In the drawings thus employed:

Figure 1 is a perspective view of the assembled adding machine; Fig. 2 is a perspective view similar to Fig. 1 but with the outer case and all but one belt and pulley assembly removed; Fig. 3 is a top plan view of the right side frame; Fig. 4 is a vertical section of the reset gears and lever on the line 4—4 of Fig. 2; Fig. 5 is a cross section view of Fig. 4 on the line 5—5 of Fig. 4; Fig. 6 is a rear elevation showing a cross section alignment of the small reset gear and the several parts comprising each number bank, on the line 6—6 of Fig. 2; Fig. 7 is an exploded plan view of the small reset gear, numbered pulley and circular cam assembly shown in Fig. 6; Fig. 8 is a vertical section of the numbered pulley and circular cam assembly on line 8—8 of Fig. 6 with the numbered pulley at position 9; Fig. 9 is a vertical section similar to Fig. 8 but with the numbered pulley at position 0; Fig. 10 is a plan view of the ratchet pawl shown in Figs. 8 and 9; Fig. 11 is a side view of the ratchet pawl inverted to show the cut-out tip; Fig. 12 is a vertical section on line 12—12 of Fig. 2 showing the flexible belt and platform assembly and also the relative position of the numbered pulley, circular cam and reset mechanism during a phase of the resetting operation; Fig. 13 is a plan view of a section of the flexible belt; and, Fig. 14 is a cross section of the flexible belt on line 14—14 of Fig. 13.

Numerals have been assigned to the several parts and features and are used in the accompanying drawings and referred to in the detailed description hereinafter:

The base 1, a left side plate 2, a right side plate 3, and a table or platform 4, constitute the framework of the machine. (See Figs. 2 and 12.) The side plates 2 and 3 are secured to the base 1 by means of four machine screws 5 which are also used to attach non-skid rubber feet 6. The side plates are also secured to the platform 4 by means of four countersunk machine screws 7. The platform 4 has vertical belt guides 8 moulded thereon thus forming channels 9 through which the flexible belts 10 may pass. Numerals from 1 to 9 and 0 to 8 for addition and subtraction respectively have been imprinted on the platform 4 within each belt channel 9, spaced to conform with the circular openings 11 in the flexible belts 10. An elongated slot 12 as illustrated in Fig. 3 is provided in the right side plate 3 to permit operation of the reset lever 13.

The outer case or shell 14 has a rectangular opening conforming in size and shape and fitting over the numbered platform 4, thus permitting access to the flexible belts 10. The right side 15 and left side 16 of the rectangular opening also become the extreme right and left belt guides respectively. Finger stops 17 are formed on the front of the rectangular opening to prevent the flexible belts 10 from being moved too far. Portholes 18 are provided in the outer case 14 to permit viewing the totals registered on the projections 19 of the numbered pulleys 32. An elongated slot 20 is also provided in the outer case 14 to permit movement of the reset lever 13. The outer case 14 is formed at the bottom 21 to permit overlapping the edges of the base 1 and is attached to the base 1 by means of a countersunk machine screw 22 at each corner.

Transversely extending between the side plates 1 and 2 previously referred to is an idler pulley shaft 23; a ratchet pawl spring shaft 24; a ratchet pawl shaft 25; and a numbered pulley shaft 26 journalled at each end in bushings 27. Shafts 23, 24, and 25 are secured in the side plates 2 and 3 with cotter pins 28 at each end.

A series of idler pulleys 29 moulded or otherwise securely attached to a bearing 30 are mounted on idler pulley shaft 23 so that they may rotate freely. The pulleys 29 serve merely as guiding means around which the belts 10 pass on their way back to the numbered pulleys 32. A series of ten point ratchet wheels 31 to which are moulded or otherwise securely attached numbered pulleys 32 having on their peripheral surface ten equally spaced radially projecting keys 19 having numerals 0 to 9 imprinted thereon, are mounted on pulley shaft 26 so that they may rotate freely between a small reset gear 33 and a series of circular cams 34 which are securely attached to shaft 26 by pins 35 or other suitable means. The entire assembly being secured against end play by a spacer collar 36. (See Fig. 6.)

As illustrated in Figs. 12, 13 and 14 each circular opening 11 in the flexible belts 10 is provided with a protruding key or grip 37, formed to fit a finger tip and thus assuring a firm grip on the flexible belt 10. The flexible belts 10 pass over the peripheral surfaces of numbered pulleys 32; the circular openings 11 fitting over and engaging the projecting keys 19; through channels 9 between belt guides 8 of numbered platform 4 and over the peripheral surfaces of idler pulleys 29. As the flexible belts 10 are advanced over the numbered platform 4, the numbered pulleys 32 are advanced a corresponding number of positions, and the numbers which appear on the projecting keys 19 in the portholes 18 are changed accordingly.

A series of pawls 38 and spacer collars 39 are mounted on ratchet pawl shaft 25 previously referred to, the pawls 38 engaging the ten point ratchet wheel 31 of the numbered pulley in the same relative position. The numbered pulleys 32 are held in proper position at each number by the tension exerted on the pawls 38 by pawl springs 40 which extend between pawls 38 and ratchet pawl spring shaft 24, the rounded point 41 on pawls 38 assisting to complete each number step. (See Figs. 8, 9, 10 and 11.)

In order to advance each pulley 32 when the next adjacent pulley on the right thereof is advanced from 9 to 0, a swivel pawl 42 with a horizontal pin 43 is mounted on the left side of each numbered pulley 32 by means of a bearing screw 44. A coil spring 45 is attached to each pawl 42 to provide a soft inward pull so that when the numbered pulleys 32 are rotated, the horizontal pins 43 will follow the peripheral surface of the circular cams 34 which are secured to the numbered pulley shaft 26 as previously described. (See Figs. 6 and 7.)

As illustrated in Figs. 8 and 9 the horizontal pin 43 of pawl 42 is kept above the teeth of the ratchet wheel 31 on the next adjacent numbered pulley on the left thereof by the peripheral surface of circular cam 34 until the numbered pulley 32 to which said pawl 42 is attached advances from position 8 to 9, at which time the flat section 46 of circular cam 34 permits the horizontal pin 43 to drop behind the cog of the adjacent ratchet wheel 31. When the numbered pulley 32 bearing pawl 42 is then advanced from position 9 to 0 the horizontal pin 43 advances the adjoining ratchet wheel 31 one position. In order to assure positive operation and to eliminate any possibility of the horizontal pin 43 slipping or riding over the cog of the next adjacent ratchet wheel 31, the flat section 46 of circular cam 34 is so positioned with relation to pawl 38 that the horizontal pin 43 also rides the peripheral surface of pawl 38 and is forced into continuous engagement with the adjacent ratchet wheel 31 by the spring tension exerted thereon by pawl spring 40. When the adjacent ratchet wheel 31 has been advanced one position the horizontal pin 43 is forced out of engagement therewith by the circular cam 34; the pin 43 escaping from pawl 38 by passing through the channel created by the cut-out tip 47 of pawl 38. (See Figs. 10 and 11.)

As illustrated in Fig. 12 the circular cam 34 and pawl 38 also are important parts of the resetting mechanism. The resetting mechanism comprises a small gear 33 securely attached to numbered pulley shaft 26 by a pin 35 as previously described, meshed with a large gear 48 which rotates freely on ratchet pawl shaft 25, and a reset lever 13 which locks over ratchet pawl spring shaft 24. (Also see Figs. 4 and 5.) The reset lever 13 is attached to the large reset gear 48 so that it may turn on the axis of a screw or rivet attachment 49. Another screw or rivet 50 is attached to reset lever 13 so that it passes through an opening 51 of larger diameter in the large reset gear 48 permitting a slight forward movement of the reset lever 13 before the large reset gear 48 is activated. In operation (see Fig. 12) the reset lever 13 is advanced through reset lever slot 12 in side plate 3, the initial forward motion unlatching the locking arm 52 from spring shaft 24, then advancing the large reset gear 48 which rotates the small reset gear 33 and the circular cams 34 clockwise as viewed in Figs. 4 and 12. As the circular cams 34 rotate clockwise the reset teeth on projections 53, one on each of the circular cams 34, engage the horizontal pins 43 of pawls 42 of any numbered pulleys 32 which are positioned at other than zero (0 on top) and advance these numbered pulleys 32 to zero position. The return motion of the reset lever 13 rotates the circular cams 34 counter clockwise to their original position, the locking arm 52 being pulled into position over spring shaft 24 by means of a tension spring 54 extending between the spring attachments 55 and 56 on reset lever 13 and side frame 3, respectively. The locking arm 52 prevents the circular cams 34 from being rotated by bearing or cam friction during adding or subtracting operations, thus assuring that the flat section 46 of the circular cams 34 is always in correct operating position.

I claim:

1. In an adding machine, the combination with two, spaced, parallel-disposed, horizontal shafts, of a plurality of pulleys rotatably mounted on each of said shafts in side-by-side relation, a plurality of parallel-disposed belts operatively connecting the pulleys on one shaft with the pulleys on the other shaft; said belts being provided with longitudinally-spaced, finger-engaging means for manually moving them to rotate said pulleys; the pulleys on one of said shafts being provided with ten, equi-circumferentially spaced, radially-extending, tooth-like projections thereon bearing the numerals 0 to 9, respectively, and positively cooperating with said belts to effect positive movements of said pulleys corresponding to the manually effected movements of said belts; the projection on said pulleys having the like numerals thereon normally disposed in aligned relation; means on adjacent pulleys cooperating with each other when the pulley on the right of said adjacent pulleys is making the last one-tenth of each complete turn for moving the pulley on the left one-tenth of a turn, a first gear fixed to said one shaft, a second gear in mesh therewith, a manually-operable lever cooperating with said second gear for effecting a rotation of said first gear and said one shaft, means on said one shaft at the left of each of the pulleys thereon and rotatable with said shaft, and means on each of said pulleys on said one shaft cooperating with one of said last mentioned means for resetting said last mentioned pulleys to their normal position with the like numerals thereon disposed in aligned relation.

2. In an adding machine, the combination with two, spaced, parallel-disposed, horizontal shafts, of a plurality of pulleys rotatably mounted on each of said shafts in side-by-side relation, a plurality of parallel-disposed belts operatively connecting the pulleys on one shaft with the pulleys on the other shaft; said belts being provided with longitudinally-spaced, finger-engaging means for manually moving them to rotate said pulleys; the pulleys on one of said shafts being provided with ten, equi-circumferentially spaced, radially-extending, tooth-like projections thereon bearing the numerals 0 to 9, respectively, and positively cooperating with said belts to effect positive movements of said pulleys corresponding to the manually effected movements of said belts; the projections on said pulleys having the like numerals thereon normally disposed in aligned relation; means on adjacent pulleys cooperating with each other when the pulley on the right of said adjacent pulleys is making the last one-tenth of each complete turn from moving the pulley on the left one-tenth of a turn, a first gear fixed to said one shaft, a second gear in mesh therewith, a manually-operable lever cooperating with said second gear for effecting a rotation of said first gear and said one shaft, a cam affixed to said one shaft between each of the pulleys thereon, and means on each of said pulleys to the right thereof cooperating with the adjacent cam for resetting said last mentioned pulleys to their normal positions with the like numerals thereon disposed in aligned relation.

3. In an adding machine, the combination with a first horizontal shaft having a plurality of pulleys rotatably mounted thereon in side-by-side relation and having numerals from 0 to 9 equi-circumferentially spaced about the peripheries thereof with like numbers normally disposed in aligned relation, of a second shaft in spaced, parallel-disposed relation to said first shaft and having a plurality of idler pulleys rotatably mounted thereon in side-by-side relation, a table above and extending between said pulleys and having a plurality of numerals from 9 to 1 thereon disposed in laterally-spaced columns conforming to the lateral spacing on said shafts of said pulleys, a plurality of belts each operatively connecting a pulley on said first shaft with one of said idler pulleys and provided with finger-engaging means for manually moving said belts to rotate said pulleys; the upper runs of said belts lying on said table each adjacent one of said columns of numerals; a ratchet wheel having ten teeth between each of said pulleys on said first shaft and positively attached to the pulley on the left of each adjacent pair of said pulleys, a pawl cooperating with each of said ratchet wheels, a cam follower attached to the right pulley of each adjacent pair of said pulleys and adapted to engage the teeth on the ratchet wheel of the pulley on the left thereof, a cam fixed to said first shaft between each of the pulleys thereon and cooperating with the adjacent follower for holding said follower out of engagement with the teeth on the adjacent ratchet wheel while the pulley on the right of each adjacent pair of said pulleys is making nine-tenths of a complete turn and then releasing said follower to engage a tooth on the ratchet wheel of the pulley on the left to effect one-tenth of a complete turn of each of said pair of pulleys together, and means for turning the pulleys on said first shaft to bring the numerals thereon into normal aligned relation comprising a gear on said first shaft, a second gear in mesh therewith and having a manually-operable lever thereon for turning said second gear to effect a rotation of said first shaft and the cams thereon; said cams being provided with means for engaging said cam followers and moving the pulleys to which said followers are attached until the like numerals thereon are disposed in normal aligned relation.

4. The structure set forth in claim 3 in which said pawls cooperate with said cam followers for holding said followers in operative engagement with the teeth of said ratchet wheels when said followers are released by said cams.

5. The structure set forth in claim 3 together with means cooperating with said gears for limiting the movement of said first gear to nine-tenths of a complete turn.

6. The structure set forth in claim 3 together with means cooperating with said gears for limiting the movement of said first gear to nine-tenths of a complete turn, and a spring cooperating with said second gear and said lever and biased automatically to return said lever, gears and cams to their initial positions when said lever is released after said second gear has been turned thereby.

7. A resetting mechanism for an adding machine of the character described having a plurality of wheels rotatively mounted on a shaft in side-by-side relation and having ten, equi-circumferentially spaced numerals from 0 to 9 on the peripheries thereof for indicating the totals of the sums added by said machine; said mechanism comprising the combination with a cam follower on the side of each wheel forming the right hand wheel of each pair of wheels, of a cam fixed to said shaft between each pair of wheels and provided with means adapted positively to engage the cam follower on the wheel to the right thereof for rotating said wheel on said shaft when said cam is rotated, and means for rotating said cams nine-tenths of one complete turn.

8. The structure set forth in claim 7 together with means for automatically rotating said cams in the reverse direction after each nine-tenths of one complete turn in one direction to return them to their initial position.

9. In an adding machine, the combination with a horizontal shaft, of a plurality of pulleys rotatably mounted thereon in side-by-side relation, a plurality of parallel-disposed belts having longitudinally spaced openings therein, and each of said pulleys being provided with ten, equi-circumferentially spaced, radially-extending, tooth-like projections thereon bearing the numerals 0 to 9, respectively, and positively cooperating with the openings in said belts to effect positive movements of said pulleys corresponding to the manually effected movements of said belts; the projections on said pulleys having the like numerals thereon normally disposed in aligned relation; means on adjacent pulleys cooperating with each other when the pulley on the right of said adjacent pulleys is making the last one-tenth of each complete turn for moving the pulley on the left one-tenth of a turn, means fixed to said shaft and cooperating with said means on the pulley to the right of said adjacent pulleys for holding said means on said pulley to the right out of cooperation with the said means on the next adjacent pulley to the left until said pulley to the right is about to make the last one-tenth of a complete turn and then releasing it to effect a simultaneous turning of both of said adjacent pulleys through one-tenth of a complete turn; a first gear affixed to said shaft; a second gear in mesh therewith; a manually operable lever cooperating with said second gear for effecting a rotation of said gears and said shaft; means on said shaft at the left of each pulley thereon and rotatable with said shaft; and means on each of said pulleys cooperating with one of said last mentioned means for resetting said pulleys to their normal positions with the like numerals thereon disposed in aligned relation.

10. In an adding machine, the combination with a horizontal shaft, of a plurality of pulleys rotatably mounted thereon in side-by-side relation; each of said pulleys being provided with the numerals 0 to 9 equi-circumferentially spaced on the peripheries thereof with like numerals normally disposed in horizontally aligned relation; a plurality of parallel-disposed belts cooperating with said pulleys, means on adjacent pulleys cooperating with each other when the pulley on the right of said adjacent pulleys is making the last one-tenth of each complete turn for moving the pulley on the left one-tenth of a turn, means fixed to said shaft and cooperating with said means on the pulley to the right of said adjacent pulleys for holding said means on said pulley to the right out of cooperation with the said means on the next adjacent pulley to the left until said pulley to the right is about to make the last one-tenth of a complete turn and then releasing it to effect a simultaneous turning of both of said adjacent pulleys through one-tenth of a complete turn; a first gear affixed to said shaft; a second gear in mesh therewith; a manually operable lever cooperating with said second gear for effecting a rotation of said gears and said shaft; means on said shaft at the left of each pulley thereon and rotatable with said shaft; means on each of said pulleys cooperating with one of said last mentioned means for resetting said pulleys to their normal position with the like numerals thereon disposed in aligned relation; and means cooperating with said lever and releasable upon a manual, gear-rotating movement of said lever for otherwise locking said gears against rotation.

RICHARD A. KRAFT.

REFERENCES CITED

The following references are of record in the file of this patent:

UNITED STATES PATENTS

| Number | Name | Date |
|---|---|---|
| 816,342 | Kodoma et al. | Mar. 27, 1906 |
| 1,494,532 | Corell | May 20, 1924 |